(12) United States Patent
Lee et al.

(10) Patent No.: US 6,275,378 B1
(45) Date of Patent: Aug. 14, 2001

(54) SAFETY LOCK FOR NOTEBOOK-TYPE COMPUTER DOCK

(75) Inventors: Chia-Chun Lee; Ming-Hsun Chou; Jui-Jung Huang; Chih-Wen Chiang, all of Taipei (TW)

(73) Assignee: Compal Electronics, Inc. (TW)

( * ) Notice: Subject to any disclaimer, the term of this patent is extended or adjusted under 35 U.S.C. 154(b) by 0 days.

(21) Appl. No.: 09/232,659

(22) Filed: Jan. 19, 1999

(51) Int. Cl.[7] .................................................... G06F 1/16
(52) U.S. Cl. ..................... 361/686; 361/683; 312/223.2; 70/58; 248/553
(58) Field of Search .................... 361/686, 683; 248/552, 553; 312/223.1, 223.2; 70/14, 57, 58, 32–34

(56) References Cited

U.S. PATENT DOCUMENTS

| | | | |
|---|---|---|---|
| 5,310,358 | * | 5/1994 | Johnson et al. ........................ 361/686 |
| 5,313,596 | * | 5/1994 | Swindler et al. ...................... 361/725 |
| 5,323,291 | * | 6/1994 | Boyle et al. .......................... 361/683 |
| 5,347,425 | * | 9/1994 | Herron et al. ......................... 361/683 |
| 5,477,415 | * | 12/1995 | Mitvham et al. ..................... 361/686 |
| 5,535,093 | * | 7/1996 | Noguchi et al. ...................... 361/686 |
| 5,568,359 | * | 10/1996 | Cavello et al. ....................... 361/686 |
| 5,737,541 | * | 4/1998 | Shimizu et al. ...................... 361/725 |
| 5,784,253 | * | 7/1998 | Ooka et al. ........................... 361/686 |
| 5,790,375 | * | 8/1998 | Lee ....................................... 361/686 |
| 5,805,412 | * | 9/1998 | Yanagisawa et al. ................ 361/686 |
| 5,841,632 | * | 11/1998 | Horii et al. ........................... 361/686 |
| 5,870,283 | * | 2/1999 | Maeda et al. ......................... 361/686 |
| 5,882,220 | * | 3/1999 | Horii et al. ........................... 361/683 |
| 5,924,878 | * | 7/1999 | Lan et al. ............................. 361/686 |
| 5,928,017 | * | 7/1999 | Lan ....................................... 361/686 |
| 5,933,322 | * | 8/1999 | Ruch et al. ........................... 361/686 |
| 5,995,366 | * | 11/1999 | Howell et al. ........................ 361/686 |
| 6,061,233 | * | 5/2000 | Jung ..................................... 361/686 |
| 6,088,229 | * | 7/2000 | Seto et al. ............................. 361/725 |

* cited by examiner

Primary Examiner—Leo P. Picard
Assistant Examiner—Lisa Lea-Edmonds
(74) Attorney, Agent, or Firm—Bacon & Thomas PLLC

(57) ABSTRACT

A safety lock for notebook-type computer dock. The safety lock serves to lock the dock with the computer to ensure safety. The safety lock also safely combines the I/O module, notebook-type computer and the dock into one body.

8 Claims, 13 Drawing Sheets

SAFETY LOCK FOR NOTEBOOK-TYPE COMPUTER DOCK

BACKGROUND OF THE INVENTION

1. Field of the Invention

The present invention relates to a safety lock for notebook-type computer dock.

2. Description of the Related Art

The conventional notebook-type computer is electrically connected with a dock without any burglarproof design. This is because that the notebook-type computer and the dock are two independent bodies and the dock is equipped with an auxiliary mechanism for retrieving the dock from the computer. Therefore, the burglarproof and protection design for the dock and computer should be considered with respect to the auxiliary retrieving mechanism.

SUMMARY OF THE INVENTION

It is a primary object of the present invention to provide a safety lock for notebook-type computer dock, which is able to lock up the entire notebook-type computer and the dock. The safety lock serves to lock the dock with the computer to ensure safety. The safety lock also safely combines the I/O module, notebook-type computer and the dock into one body.

The present invention can be best understood through the following description and accompanying drawings.

DETAILED DESCRIPTION OF THE PREFERRED EMBODIMENTS

Figure 1:
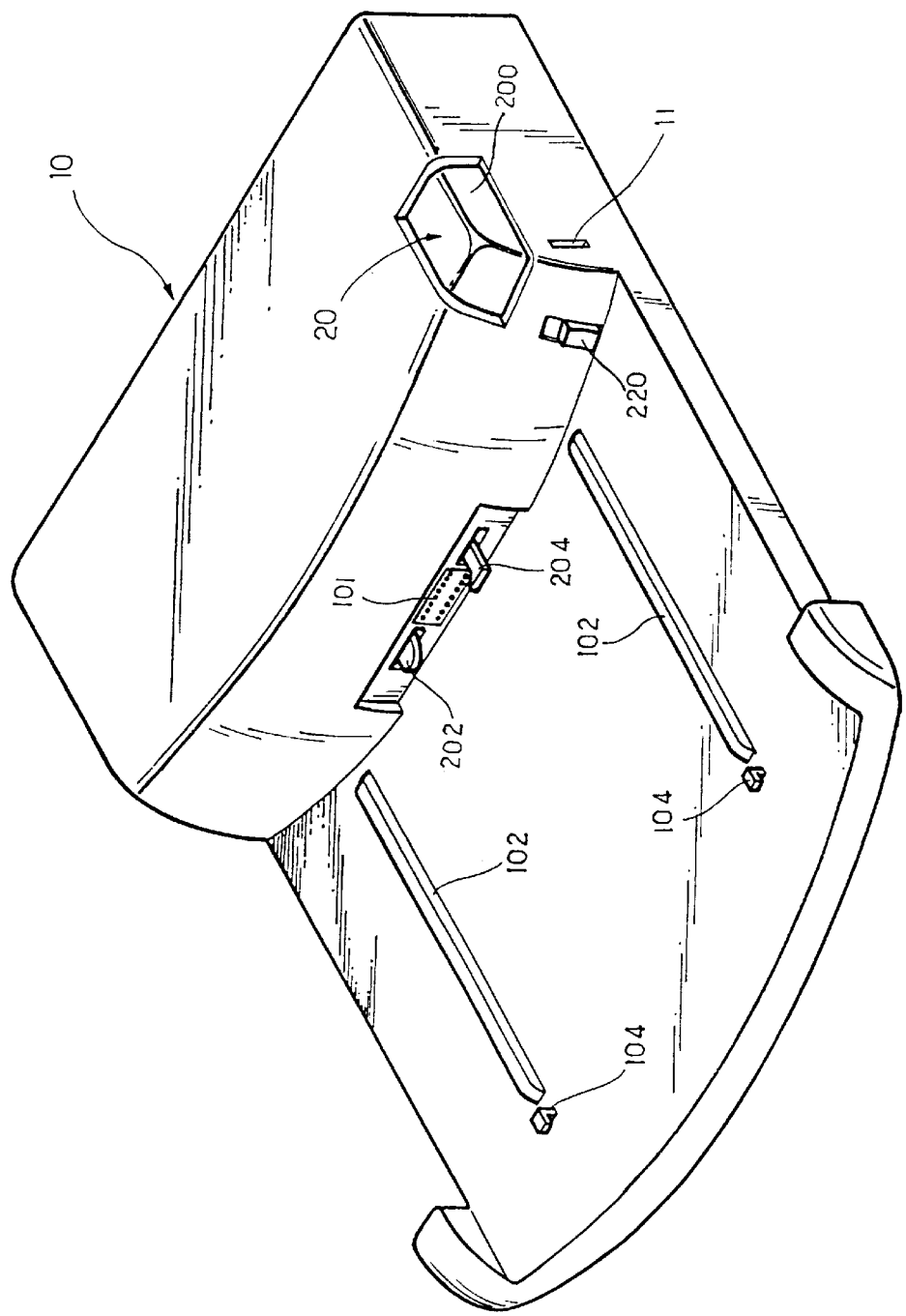
FIG. 1 is a perspective view of a first embodiment of the dock of the present invention.
Figure 2:
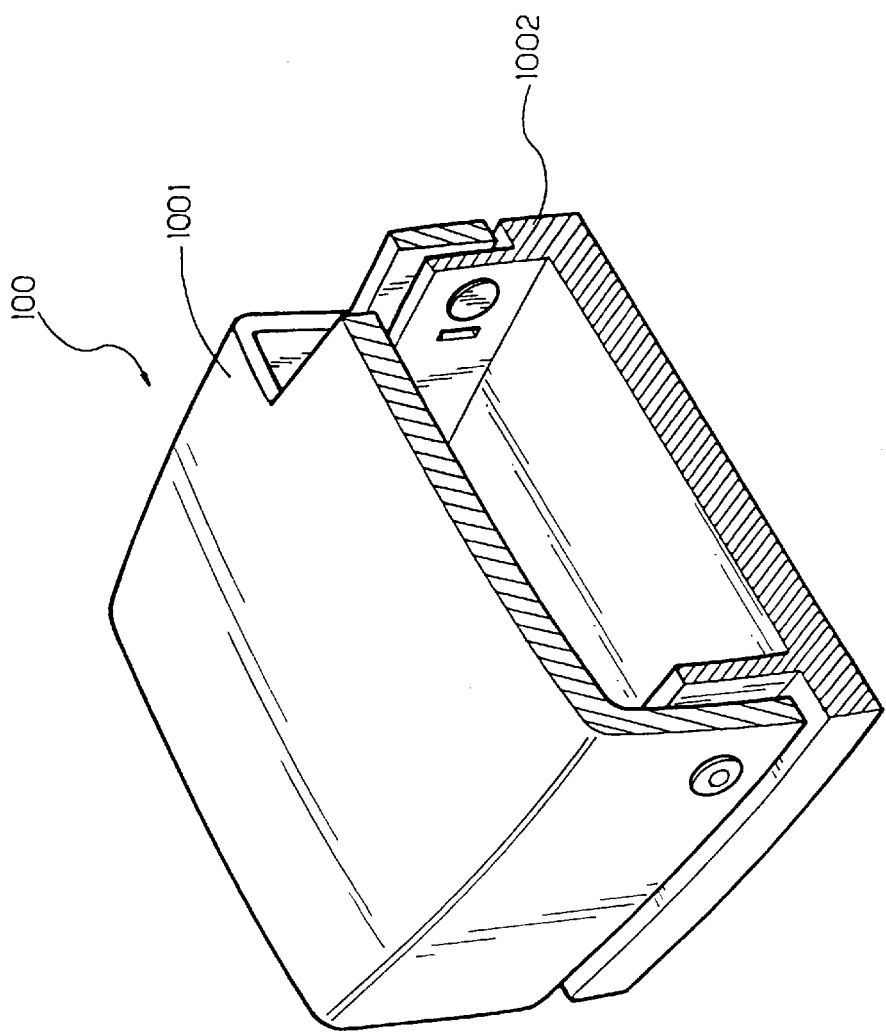
FIG. 2 is a sectional view of a part of the housing of the dock of the present invention.

Please refer to FIG. 1. The dock 10 is electrically connected with a notebook-type computer via a connector 101. The dock 10 is disposed with a pushing device 20. FIG. 2 shows the housing 100 of the dock 10. The housing 100 is composed of an upper and a lower casings 1001, 1002 mated with each other. The structure for assembling the casings pertains to prior art and thus will not be further described hereinbelow. The dock 10 is formed with a fixing hole 11.

Figure 3:
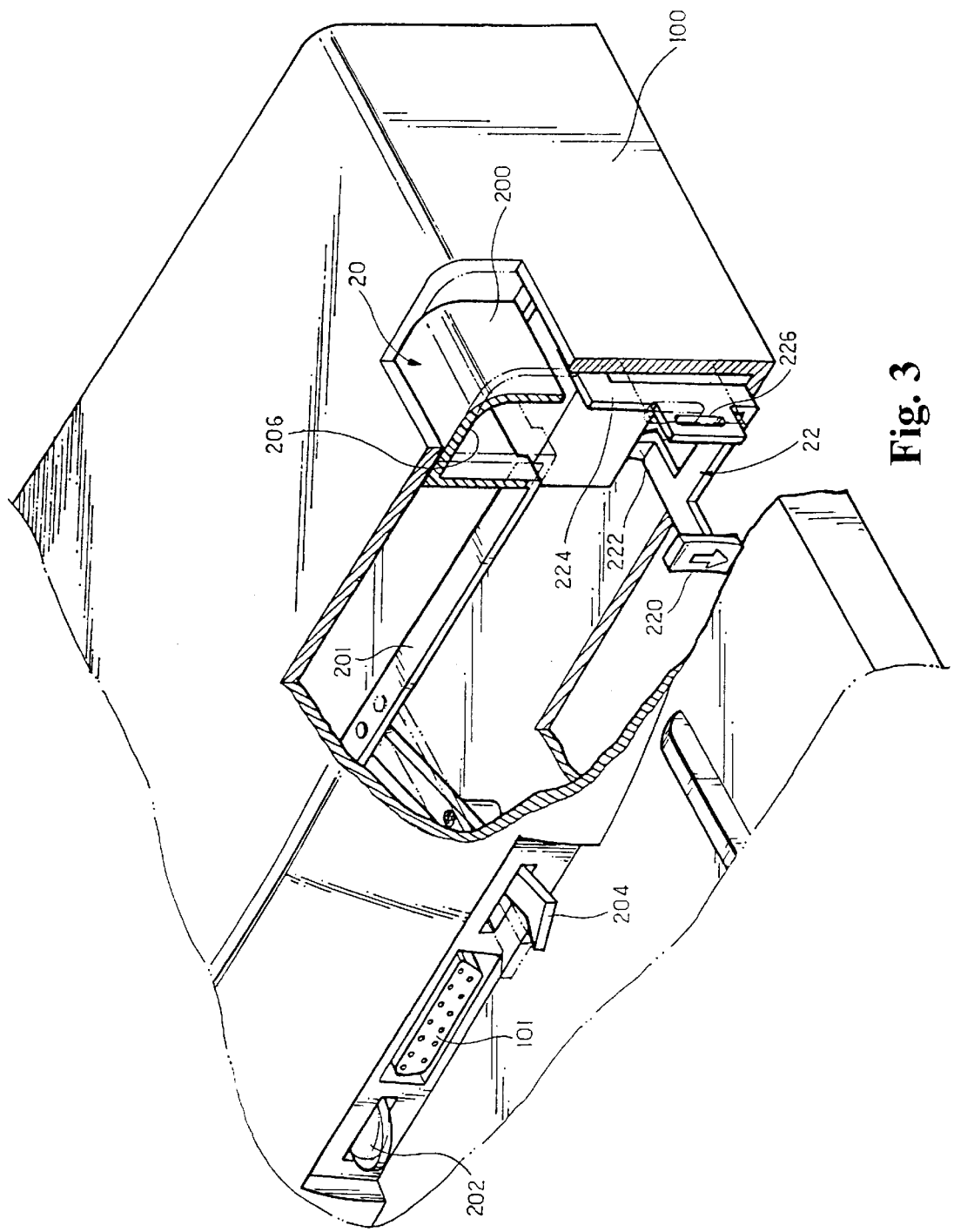
FIG. 3 is a partially sectional view of the dock of the first embodiment of the dock of the present invention.

Referring to FIG. 3, the pushing device 20 is composed of an activating section 200 (which in this embodiment is a push button), a linkage mechanism 201, a pushing section 202 and an engaging section 204. The engaging section 204 is omissible. The activating section 200 is formed with a receptacle 206.

Still referring to FIG. 3, the dock safety lock 22 includes a shifting section 220, a first detent plate 224 and a lock slot 226. The main part of the safety lock 22 is received in the housing 100 of the dock 10.

Referring to FIGS. 1 and 3, the shifting section 220 can be shifted to an on or an off position (which will be further defined hereinbelow). In this embodiment, the shifting section 220 is a lever member. However, the shifting section 220 is not limited to the lever member. The first detent plate 224 is fixedly connected with the shifting section 220 to form a linking body. The first detent plate 224 corresponds to the receptacle 206 of the activating section 200. The lock slot 226 is adjacent to the linking body formed by the shifting section 220 and the first detent plate 224.

Figure 4:
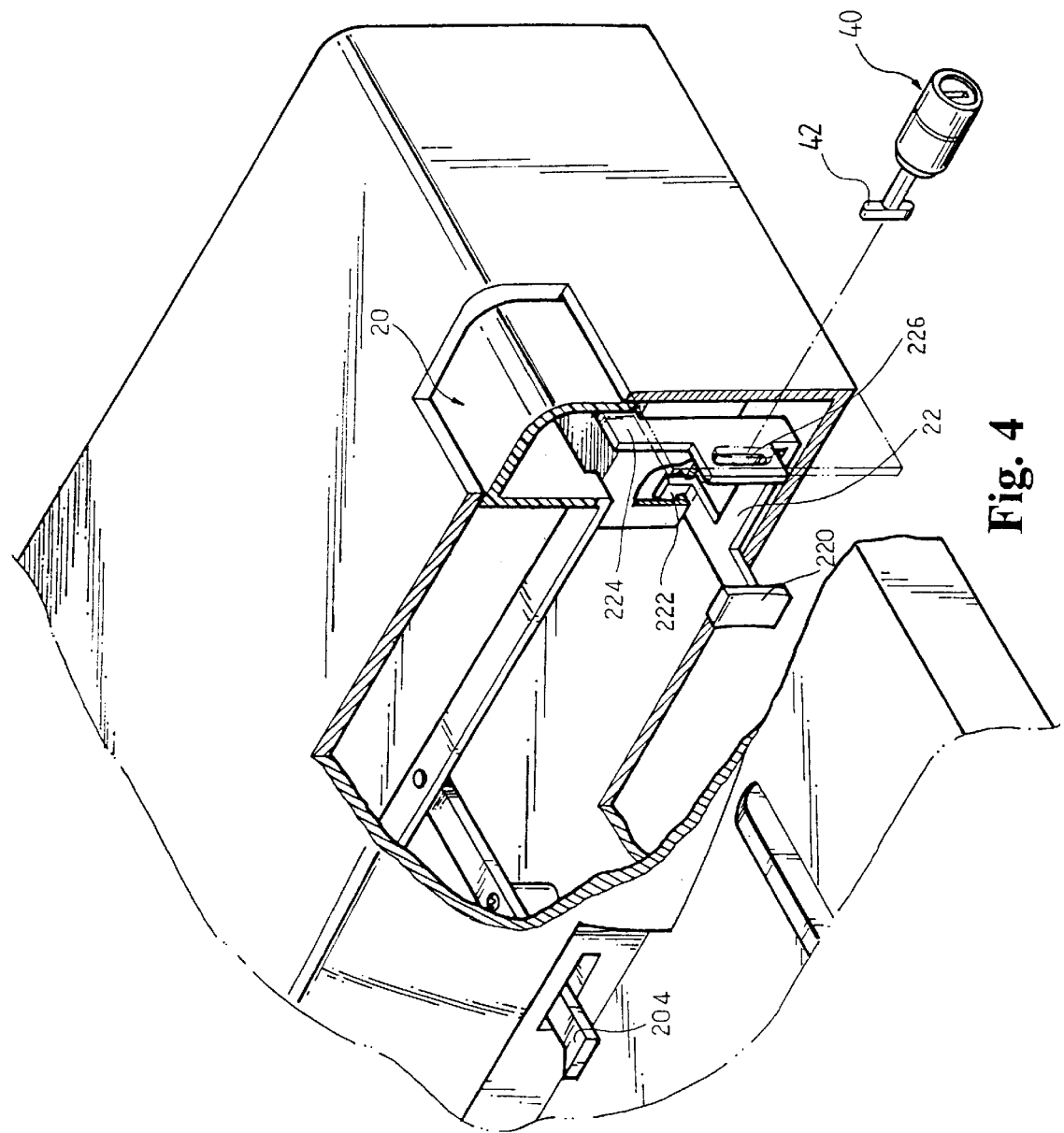
FIG. 4 is a partially sectional view according to FIG. 3, in which a lock device is applied to the dock of the present invention.

FIG. 3 shows that the shifting section 220 is positioned on the on position where the shifting section 220 is not received in the receptacle 206 of the activating section 200. Under such circumstance, the first detent plate 224 is not engaged with the activating section 200. Referring to FIG. 4, when the shifting section 220 is positioned on the off position, the first detent plate 224 is inserted into the activating section 200 to make the first detent plate 224 engage with the activating section 200.

When the shifting section 220 is shifted to the off position, the lock slot 226 is aligned with the fixing hole 11 of the dock 10 (referring to FIG. 1). At this time, a lock device 40 can be passed through the fixing hole 11 and the lock slot 226 with a stopper section 42 at a rear end of the lock device 40 abutting against one side of the lock slot 226 to achieve a locking effect. Therefore, the housing 100 is locked up and cannot be opened and the components enclosed in the housing 100 (such as main board or other electronic circuit boards) are protected from being taken out.

Figure 5:
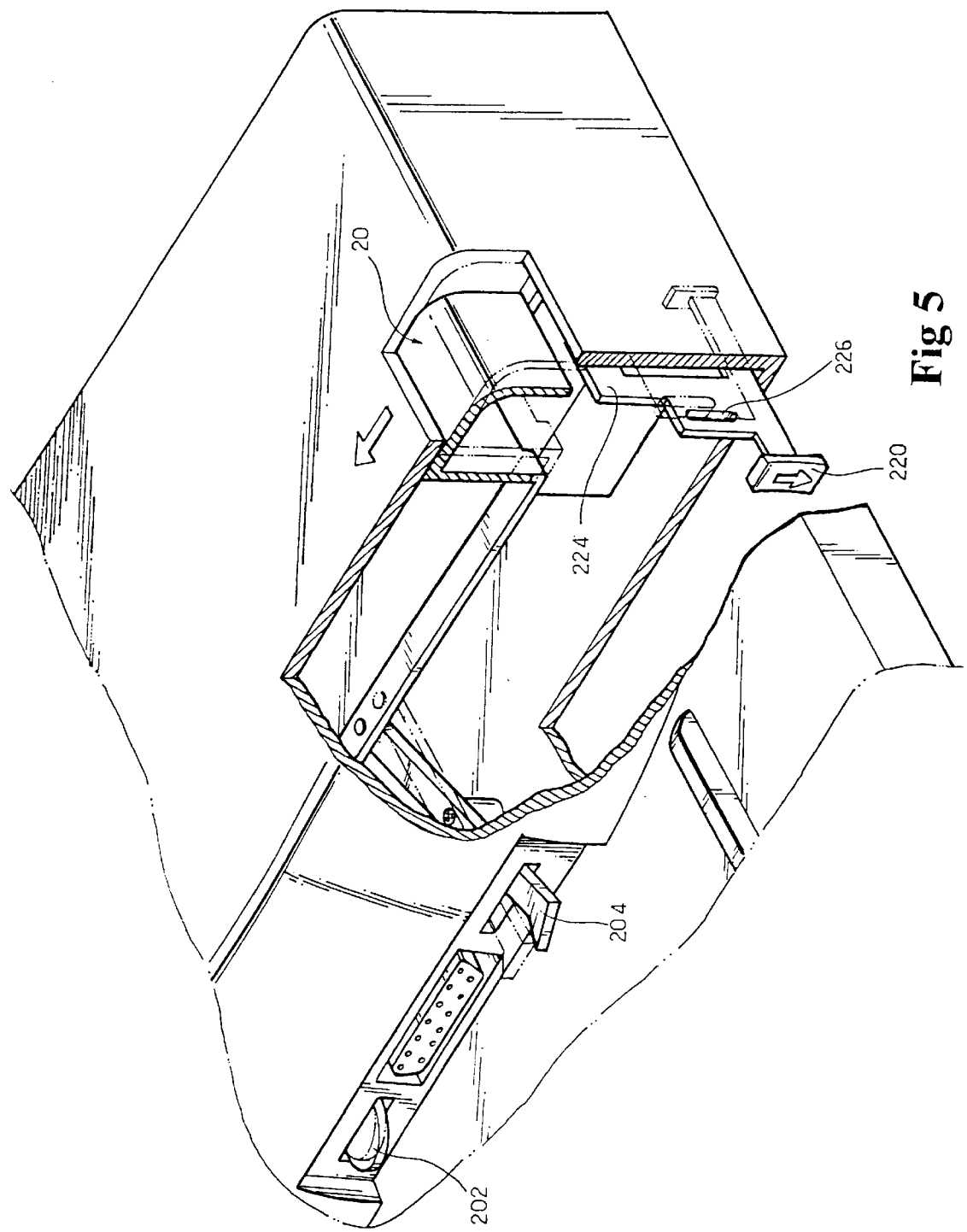
FIG. 5 is a partially sectional view of another embodiment of the safety lock of the present invention.

The opening measures for the activating section 200 can be divided into two types, that is, outward shifting type and pressing type. FIG. 5 shows the pressing type operation (in the direction of the arrow). After the activating section 200 is pressed, the engaging section 204 releases the notebook-type computer 12 (referring to FIG. 8) and the pushing section 202 outward pushes the computer 12.

Figure 6:
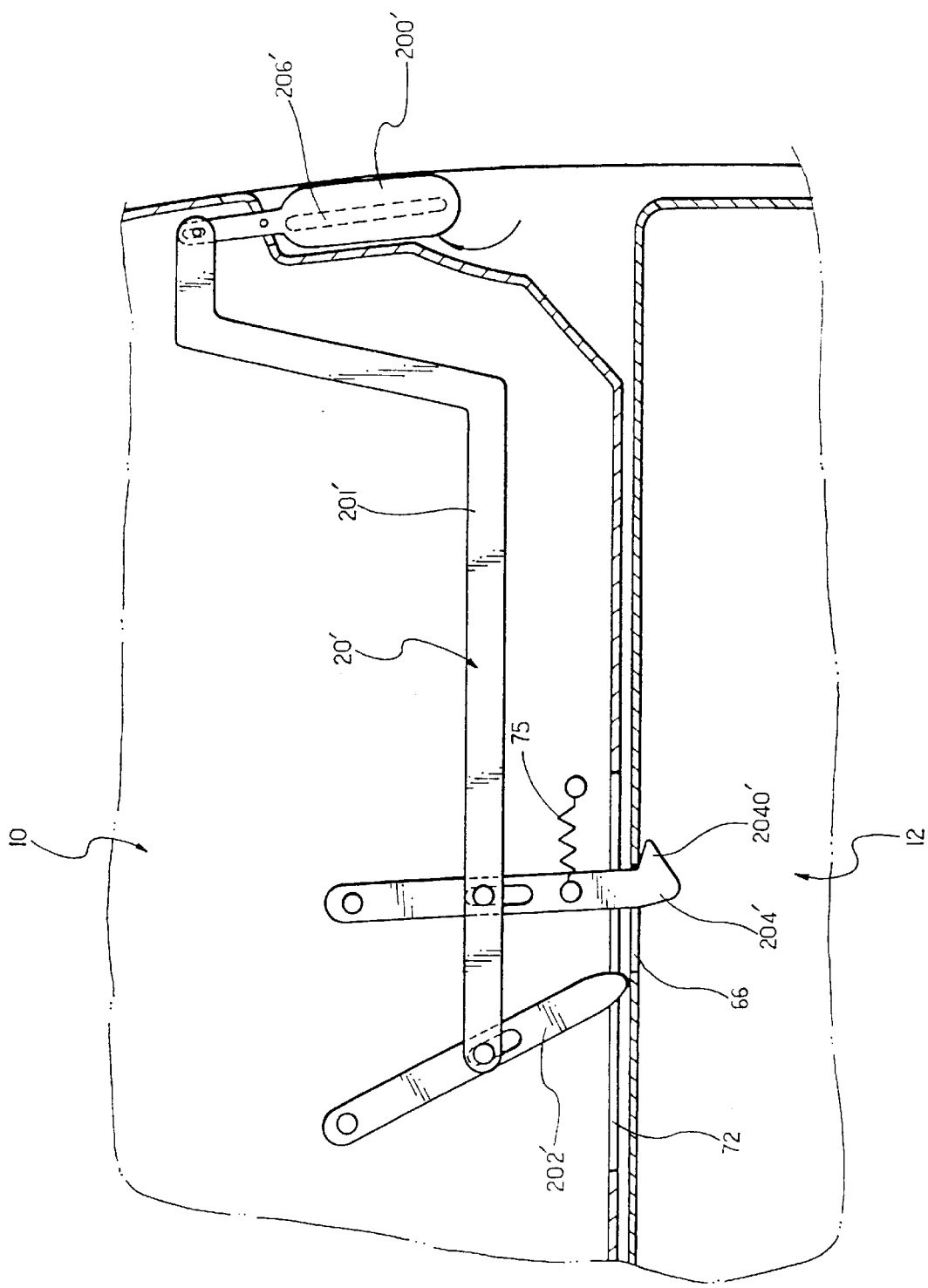
FIG. 6 shows another embodiment of the pushing device of the present invention in one state.

FIG. 6 shows the outward shifting type operation (in the direction of the arrow). In such measure, the pushing device 20' is composed of an activating section 200' (which in this embodiment is a handle), a linkage mechanism 201', a pushing section 202' and an engaging section 204'. A front end of the pushing section 202' extends out of the housing 100. Also, a front end of the engaging section 204' extends out of the housing 100. When connected, the engaging slot 66 of the computer 12 is aligned with the engaging section 204' which is forced to rotate clockwise. After a hook 2040' of the engaging section 204' extends into the engaging slot 66, a spring 75 resiliently bounds and restores the engaging section 204' to its home position to complete the connection between the dock and the computer as shown in FIG. 6.

Figure 7:
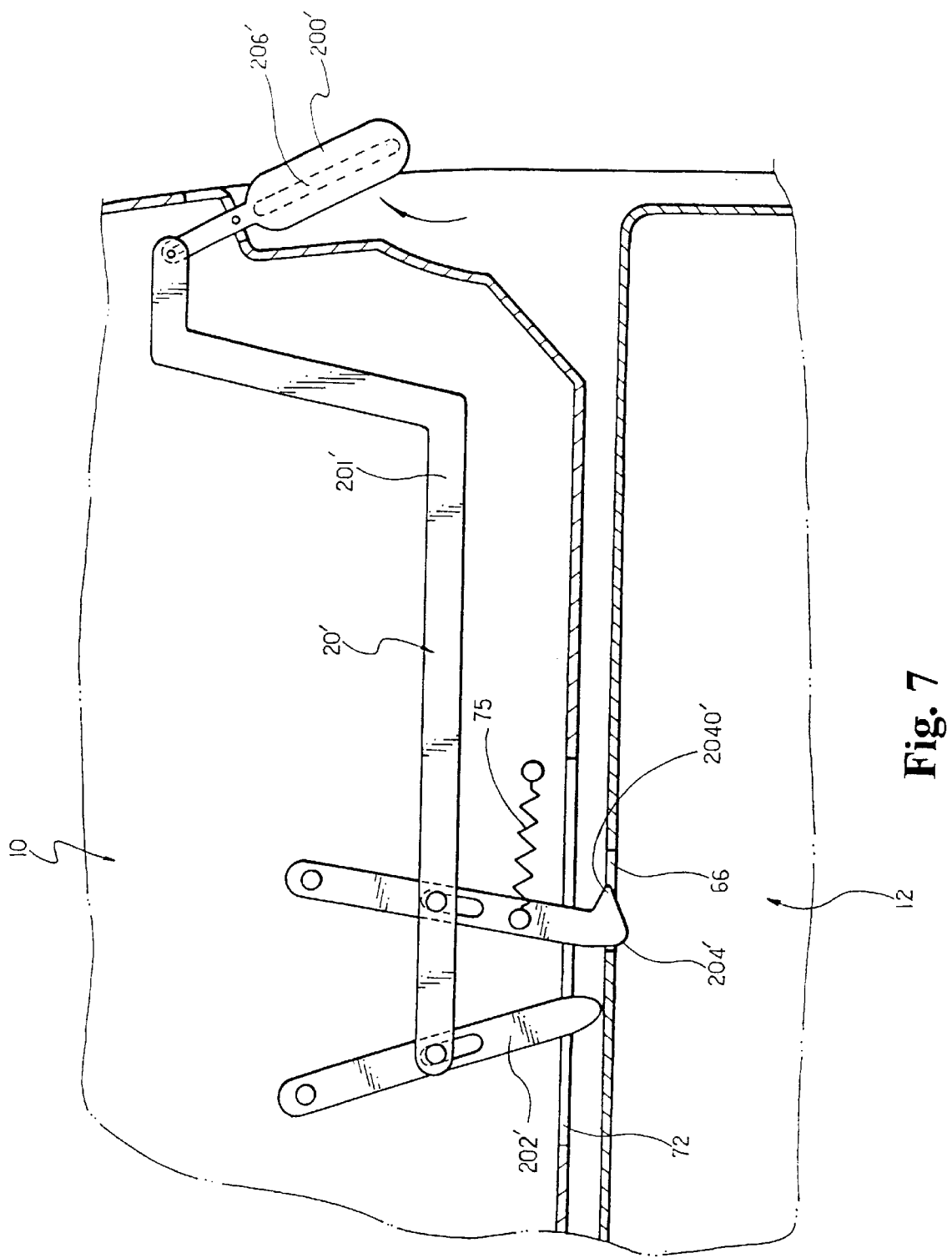
FIG. 7 is a view according to FIG. 6, showing the pushing device of the present invention in another state.

Referring to FIG. 7, when pushing out the computer 12, the activating section 200' is first forced. At this time, the activating section 200' is counterclockwise rotated and the linkage mechanism 201' is linearly leftward moved to drive the hook 2040' to clockwise rotate and disengage from the computer 12. Also, the pushing section 202' is clockwise rotated out of the opening 72 to abut against and push out the computer 12. The activating section 200' has a receptacle 206' for engaging with the first detent plate 224.

Figure 9:
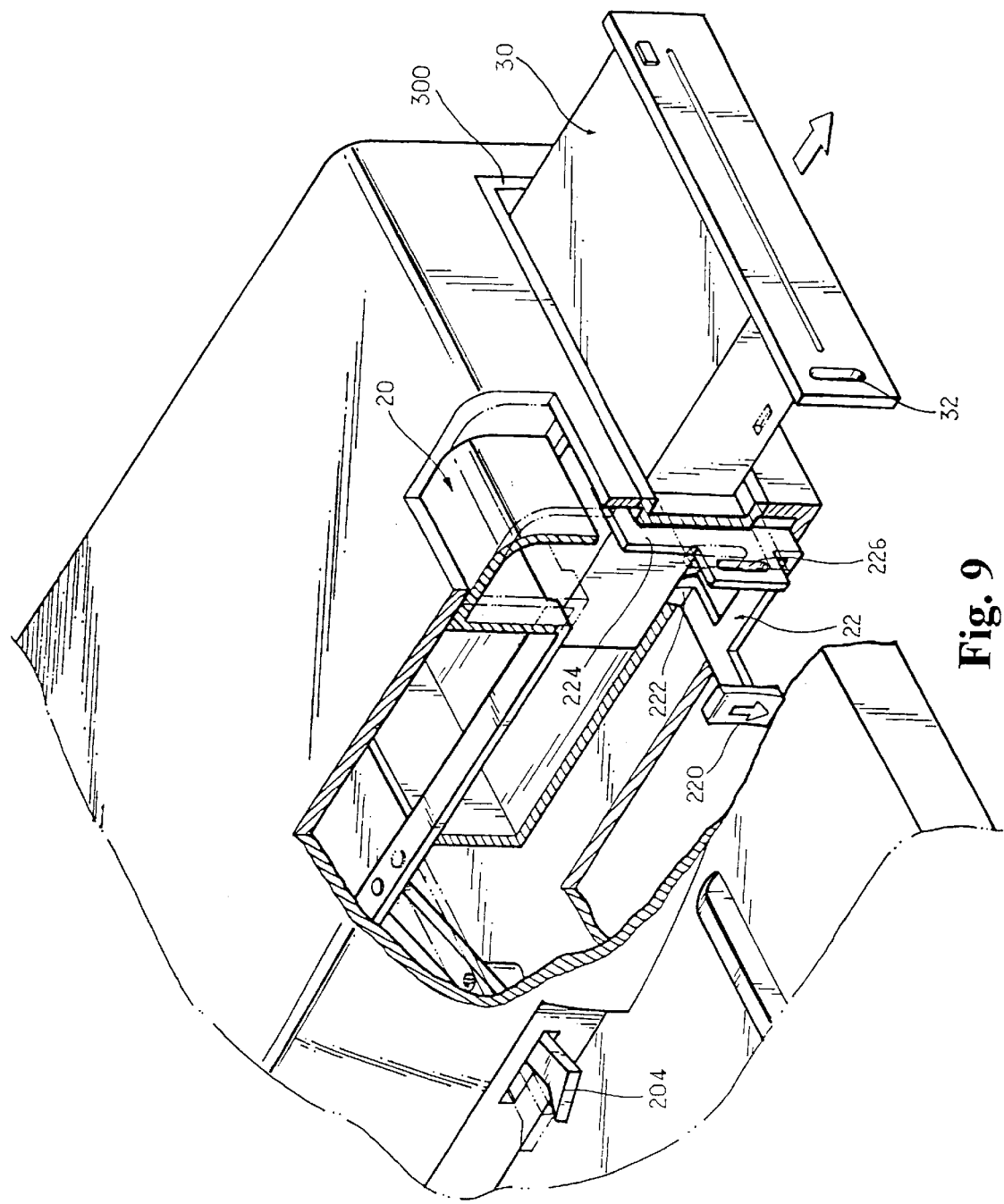
FIG. 9 is a partially sectional view of still another embodiment of the dock of the present invention.
Figure 10:
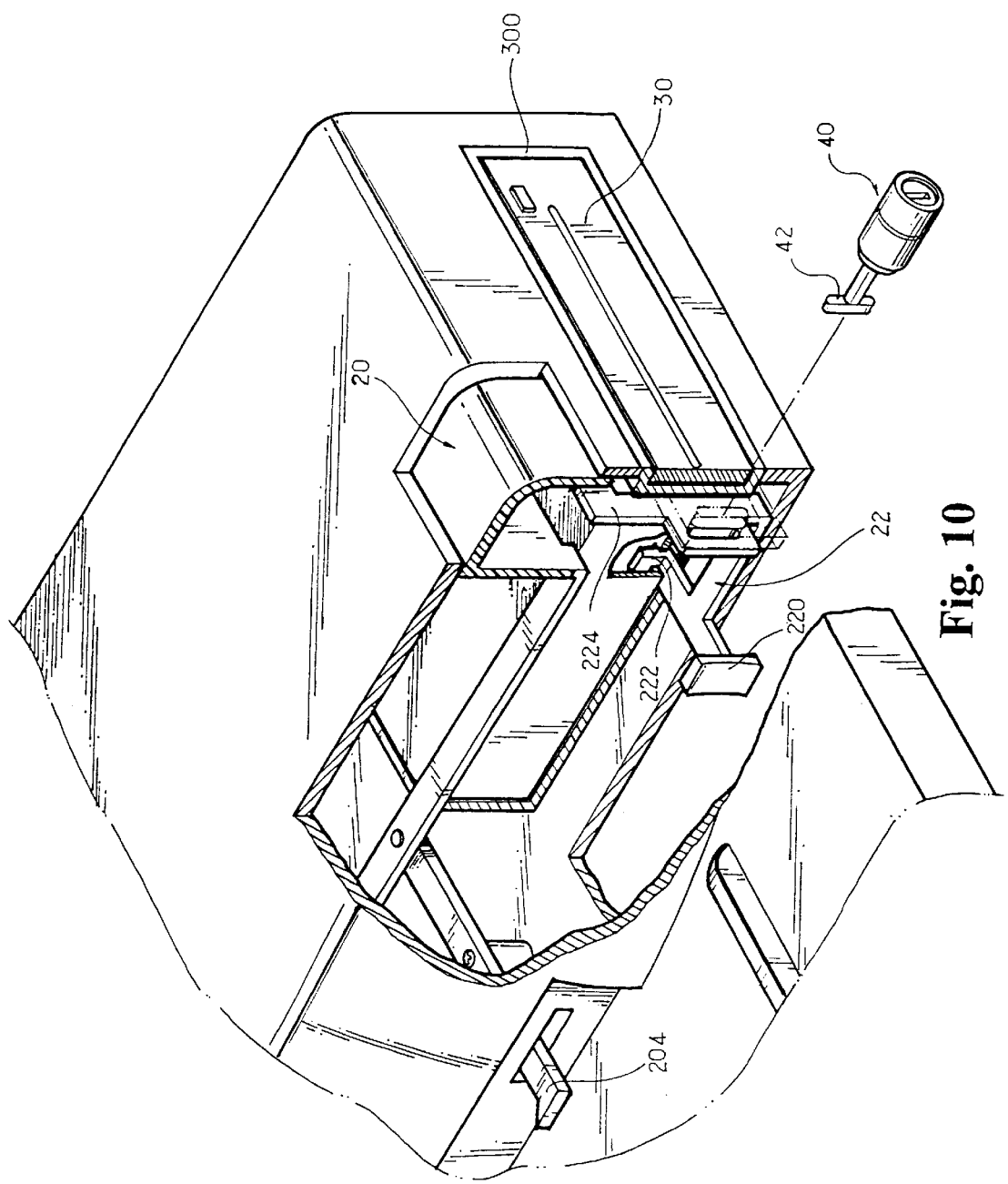
FIG. 10 is a partially sectional view according to FIG. 9, in which a lock device is applied to the dock of the present invention.

Referring to FIG. 9, the dock 10 is disposed with an I/O module adjusting frame 300 for receiving an I/O module 30. (The measure for pivotally connecting the I/O module adjusting frame 300 with the dock 10 pertains to prior art and will not be described hereinbelow.) In order to accommodate different sizes of I/O modules 30, the adjusting frame 300 can be designed with different dimensions of interior spaces. However, the adjusting frames have the same outer size, so that different sizes of I/O modules 30 have corresponding I/O adjusting frames 300 which can be received in the same dock 10. The I/O module 30 is disposed with a lock slot 32 corresponding to the lock slot 226.

Figure 11:
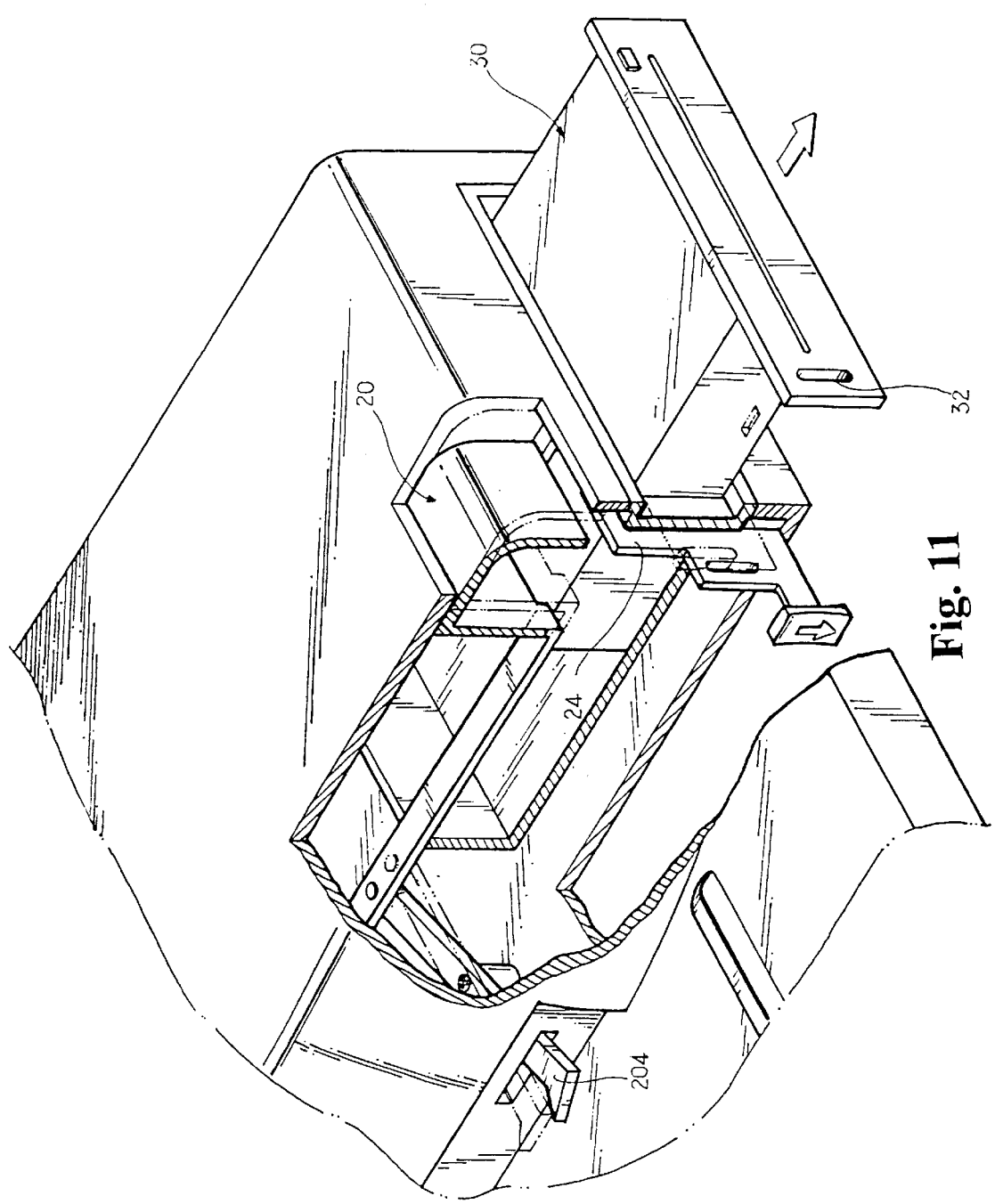
FIG. 11 shows a second embodiment of the safety lock with respect to the dock of FIG. 10.
Figure 12:
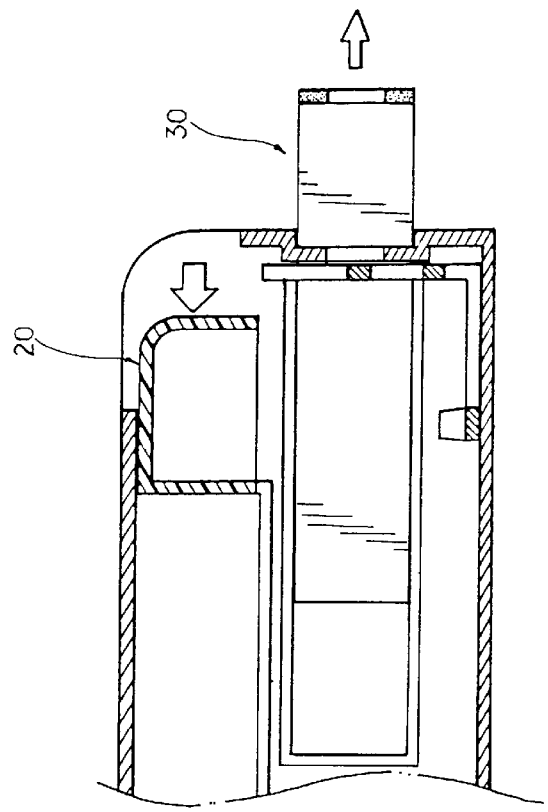
FIG. 12 is a side sectional view showing the cooperation between the dock and the lock device of the present invention in one state.
Figure 13:
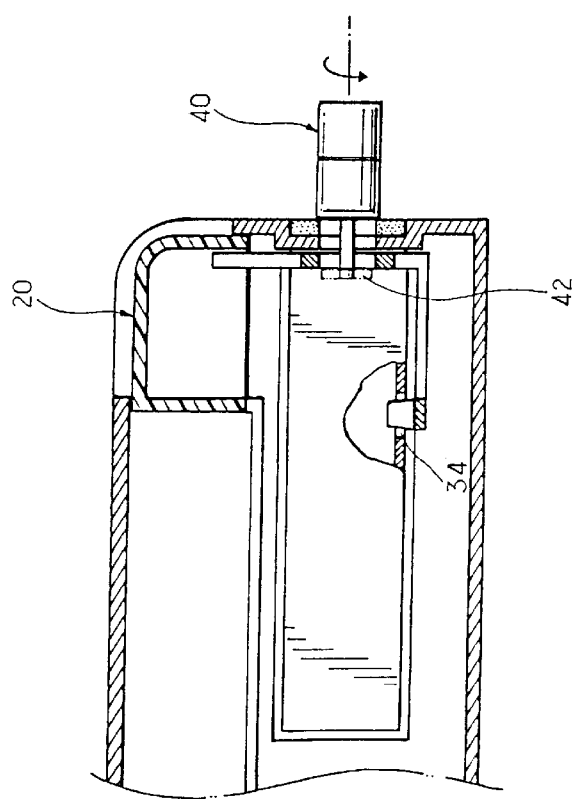
FIG. 13 is a side sectional view showing the cooperation between the dock and the lock device of the present invention in another state.

Please refer to FIGS. 5 and 11 which show another embodiment of the safety lock 22. The shifting section 220 and the first detent plate 224 are connected with each other via a substantially L-shaped structure. The lock slot 226 is adjacent to the shifting section 220 and the first detent plate 224.

Referring to FIGS. 3, 5, 12 and 13, the safety lock 22 further includes a second detent plate 222 extending from the connection body of the shifting section 220 and the first detent plate 224. The dock 10 is disposed with a recess 34 corresponding to the second detent plate 222. When the shifting section 220 is set in an off state, the second detent plate 222 is inserted into the recess 34 in a latched state. The lock device 40 is passed through the fixing slot 11 of the dock 10, the lock slot 32 and lock slot 226 to more firmly lock the computer 12 with the dock 10.

Figure 8:
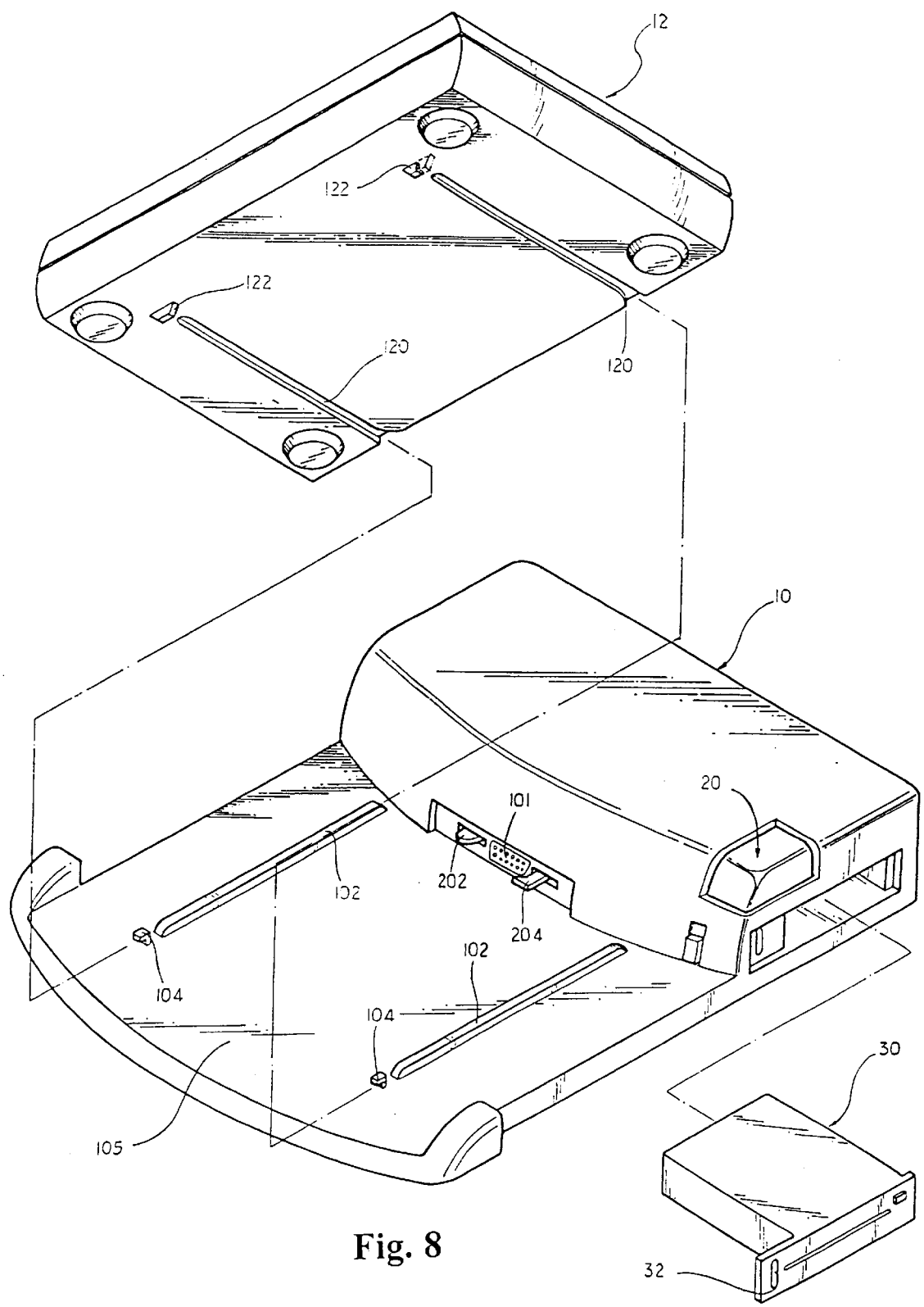
FIG. 8 shows the assembly of the dock and the notebook-type computer of the present invention.
Figure 14:
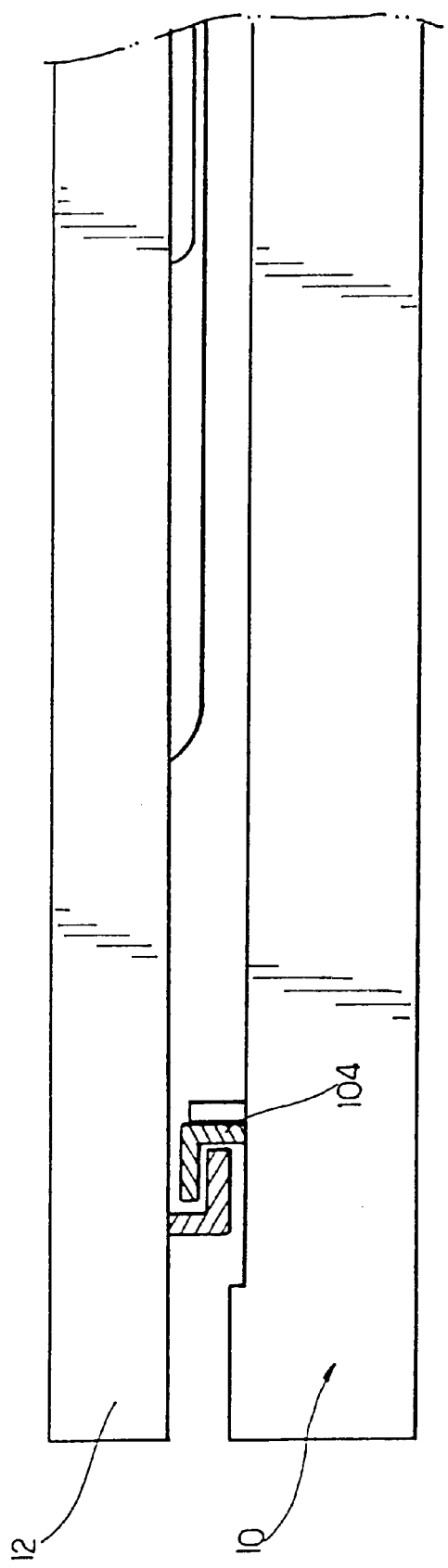
FIG. 14 is a side partially sectional view showing the connection between the dock and the notebook-type computer of the present invention.

Referring to FIGS. 8 and 14, the connecting face 105 of the dock 10 for connecting with the computer 12 is disposed with a reverse L-shaped engaging block 104. The bottom of the computer 12 is disposed with an L-shaped engaging block 124 corresponding to the reverse L-shaped engaging block 104. After the computer 12 is connected with the dock 10, the two engaging blocks are engaged with each other and then the lock device 40 is used to lock the computer 12 with the dock 10. Accordingly, the computer 12 is more effectively protected and more firmly locked on the dock 10.

It should be noted that the above description and accompanying drawings are only used to illustrate some embodiments of the present invention, not intended to limit the scope thereof. Any modification of the embodiments should fall within the scope of the present invention.

What is claimed is:

1. A safety lock for notebook-type computer dock, the safety lock cooperating with a pushing device of the dock, the pushing device serving to push a notebook-type computer connectable on the dock, the pushing device being disposed with an activating section having a receptacle, the safety lock further comprising:

a shifting section extending from an interior of the dock out of the dock to be shifted to an on position or an off position;

a first detent plate received in the dock and fixedly connected with the shifting section, the first detent plate corresponding to the receptacle of the activating section of the dock, whereby when the shifting section is positioned on the on position, the first detent plate is not engaged with the receptacle of the activating section, while when the shifting section is positioned on the off position, the first detent plate is engaged with the receptacle of the activating section; and a lock slot adjoined with a connection body of the shifting section and the first detent plate, whereby when the shifting section is shifted to the off position, a lock device can be passed through the lock slot to lock the dock.

2. A safety lock for notebook-type computer dock, the safety lock cooperating with a pushing device of the dock, the pushing device serving to push a notebook-type computer connectable on the dock, the pushing device being disposed with an activating section having a receptacle, the safety lock further comprising:

a shifting section extending from an interior of the dock out of the dock to be shifted to an on position or an off position;

a first detent plate received in the dock and fixedly connected with the shifting section, the first detent plate corresponding to the receptacle of the activating section of the dock, whereby when the shifting section is positioned on the on position, the first detent plate is not engaged with the receptacle of the activating section, while when the shifting section is positioned on the off position, the first detent plate is engaged with the receptacle of the activating section;

a lock slot adjoined with a connection body of the shifting section and the first detent plate, whereby when the shifting section is shifted to the off position, a lock device can be passed through the lock slot to lock the dock; and wherein the dock is disposed with an I/O module formed with a lock slot corresponding to the lock slot of the safety lock, whereby when the shifting section is set in an off state, a lock device can be passed through the lock slot of the safety lock and the lock slot of the I/O module to lock the dock.

3. A safety lock as claimed in claim 2, wherein the dock is pivotally disposed with an I/O module adjusting frame for receiving an I/O module, whereby when the size of the I/O module is changed, the adjusting frame is replaced by another adjusting frame having different size of interior receiving space, while having the same outer size.

4. A safety lock as claimed in claim 3, wherein the dock is disposed with a connecting face for connecting with the notebook-type computer, the connecting face being disposed with a reverse L-shaped engaging block, a bottom of the computer being disposed with an L-shaped engaging block corresponding to the reverse L-shaped engaging block, whereby after the computer is connected with the dock, the two engaging blocks are engaged with each other to more firmly lock the dock with the computer.

5. A safety lock as claimed in claim 2, wherein the dock is disposed with a connecting face for connecting with the notebook-type computer, the connecting face being disposed with a reverse L-shaped engaging block, a bottom of the computer being disposed with an L-shaped engaging block corresponding to the reverse L-shaped engaging block, whereby after the computer is connected with the dock, the two engaging blocks are engaged with each other to more firmly lock the dock with the computer.

6. A safety lock, for notebook-type computer dock, the safety lock cooperating with a pushing device of the dock, the pushing device serving to push a notebook-type computer connectable on the dock, the pushing device being disposed with an activating section having a receptacle, the safety lock further comprising:

- a shifting section extending from an interior of the dock out of the dock to be shifted to an on position or an off position;
- a first detent plate received in the dock and fixedly connected with the shifting section, the first detent plate corresponding to the receptacle of the activating section of the dock, whereby when the shifting section is positioned on the on position, the first detent plate is not engaged with the receptacle of the activating section, while when the shifting section is positioned on the off position, the first detent plate is engaged with the receptacle of the activating section;
- a lock slot adjoined with a connection body of the shifting section and the first detent plate, whereby when the shifting section is shifted to the off position, a lock device can be passed through the lock slot to lock the dock; and
- wherein a second detent plate extends from the connection body of the shifting section and the first detent plate, the interior of the dock being formed with a recess corresponding to the second detent plate, whereby when the shifting section is set in an off state, the second detent plate is engaged with the recess to enhance the locking effect.

7. A safety lock as claimed in claim 6, wherein the dock is disposed with a connecting face for connecting with the notebook-type computer, the connecting face being disposed with a reverse L-shaped engaging block, a bottom of the computer being disposed with an L-shaped engaging block corresponding to the reverse L-shaped engaging block, whereby after the computer is connected with the dock, the two engaging blocks are engaged with each other to more firmly lock the dock with the computer.

8. A safety lock for notebook-type computer dock, the safety lock cooperating with a pushing device of the dock, the pushing device serving to push a notebook-type computer connectable on the dock, the pushing device being disposed with an activating section having a receptacle, the safety lock further comprising:

- a shifting section extending from an interior of the dock out of the dock to be shifted to an on position or an off position;
- a first detent plate received in the dock and fixedly connected with the shifting section, the first detent plate corresponding to the receptacle of the activating section of the dock, whereby when the shifting section is positioned on the on position, the first detent plate is not engaged with the receptacle of the activating section, while when the shifting section is positioned on the off position, the first detent plate is engaged with the receptacle of the activating section;
- a lock slot adjoined with a connection body of the shifting section and the first detent plate, whereby when the shifting section is shifted to the off position, a lock device can be passed through the lock slot to lock the dock; and
- wherein the dock is disposed with a connecting face for connecting with the notebook-type computer, the connecting face being disposed with a reverse L-shaped engaging block, a bottom of the computer being disposed with an L-shaped engaging block corresponding to the reverse L-shaped engaging block, whereby after the computer is connected with the dock, the two engaging blocks are engaged with each other to more firmly lock the dock with the computer.

* * * * *